United States Patent
Hsiao

(10) Patent No.: US 7,431,391 B2
(45) Date of Patent: Oct. 7, 2008

(54) ADJUSTMENT ASSEMBLY FOR A BICYCLE SEAT

(75) Inventor: Ming-Hung Hsiao, Changhua (TW)

(73) Assignee: Lee Chi Enterprises Co., Ltd., Changhua (TW)

( * ) Notice: Subject to any disclaimer, the term of this patent is extended or adjusted under 35 U.S.C. 154(b) by 228 days.

(21) Appl. No.: 11/333,403

(22) Filed: Jan. 18, 2006

(65) Prior Publication Data

US 2007/0164590 A1    Jul. 19, 2007

(51) Int. Cl.
*B62J 1/00* (2006.01)

(52) U.S. Cl. .............................. 297/215.15; 297/215.14

(58) Field of Classification Search ............ 297/215.12, 297/215.14, 195.1, 206, 215.13, 215.15; 403/110
See application file for complete search history.

(56) References Cited

U.S. PATENT DOCUMENTS 5,020,851 A * 6/1991 Chen ....................... 297/195.1
5,244,301 A * 9/1993 Kurke et al. ................. 403/390
5,988,741 A * 11/1999 Voss et al. ............. 297/215.15
2003/0080594 A1* 5/2003 Geyer et al. ............ 297/215.13
2003/0227198 A1* 12/2003 Menayan ............... 297/215.14
2004/0174052 A1* 9/2004 Barnett ................... 297/215.13
2006/0006707 A1* 1/2006 Lin ......................... 297/215.14

* cited by examiner

*Primary Examiner*—David R Dunn
*Assistant Examiner*—Kaitlin A Wilson
(74) *Attorney, Agent, or Firm*—Troxell Law Office, PLLC

(57) ABSTRACT

An adjustment assembly for securing a bicycle seat includes a base adapted to be mounted on top of a seat post and having an arcuate rail formed on two opposed sides of the base, two adjusting seats oppositely and slidably connected to the base. Each adjusting seat has an arcuate track to receive therein a corresponding one of the arcuate rail of the base such that the two adjusting seats are movable relative to the base after the two arcuate rails of the base are received in the corresponding arcuate tracks of the adjusting seats and the bicycle seat sandwiched between the two adjusting seats is able to move along with the two adjusting seats relative to the base to accomplish angle change purpose and a securing element extending through the two adjusting seats to threadingly connect to a nut for securing the bicycle seat sandwiched between the two adjusting seats.

4 Claims, 10 Drawing Sheets

ADJUSTMENT ASSEMBLY FOR A BICYCLE SEAT

BACKGROUND OF THE INVENTION

1. Field of the Invention

The present invention relates to an adjustment assembly, and more particularly to an adjustment assembly for a bicycle seat so that the user is able to adjust seat angle relative to the seat post according to the road conditions to have a comfortable ride with the bicycle.

2. Description of the Related Art

Nowadays, a bicycle seat normally is divided into two categories, one with two bars extending from a bottom of the seat to be movably attached to a seat post and the other one being provided with an extension formed on the bottom face of the seat to be movable relative to the seat post. Both seat categories are able to be adjusted according to the rider's requirements. However, the seat adjustment device is so configured that the rider can only adjust the seat angle within a limited scope, which often can not provide a comfortable ride to the rider due to the variety of road conditions.

To overcome the shortcomings, the present invention tends to provide an improved adjustment assembly to mitigate the aforementioned problems.

SUMMARY OF THE INVENTION

The primary objective of the present invention is to provide an adjustment assembly so that the rider is able to adjust the seat angle according to requirements.

In another objective of the present invention, the adjustment assembly is composed of a base adapted to be mounted on top of a seat post and two adjusting seats respectively and movably provided on two opposed sides of the base to be adapted for clamping therebetween a bicycle seat via a securing element such that the bicycle seat as well as the two adjusting seats is able to move relative to the base to accomplish the purpose of adjusting the seat angle.

In yet another objective of the present invention, each adjusting seat is provided with teeth formed on an inner face thereof to correspond to the teeth of the other adjusting seat so that when the bicycle seat is sandwiched between the adjusting seats, the bicycle seat is secured.

A further objective of the present invention is that the securing element is selected from a group consisting essentially of a combination of a bolt and a nut or a combination of a handle with a wedged head to engage with a side face of one of the adjusting seat and a nut.

Other objects, advantages and novel features of the invention will become more apparent from the following detailed description when taken in conjunction with the accompanying drawings.

DETAILED DESCRIPTION OF THE PREFERRED EMBODIMENT

Figure 1:
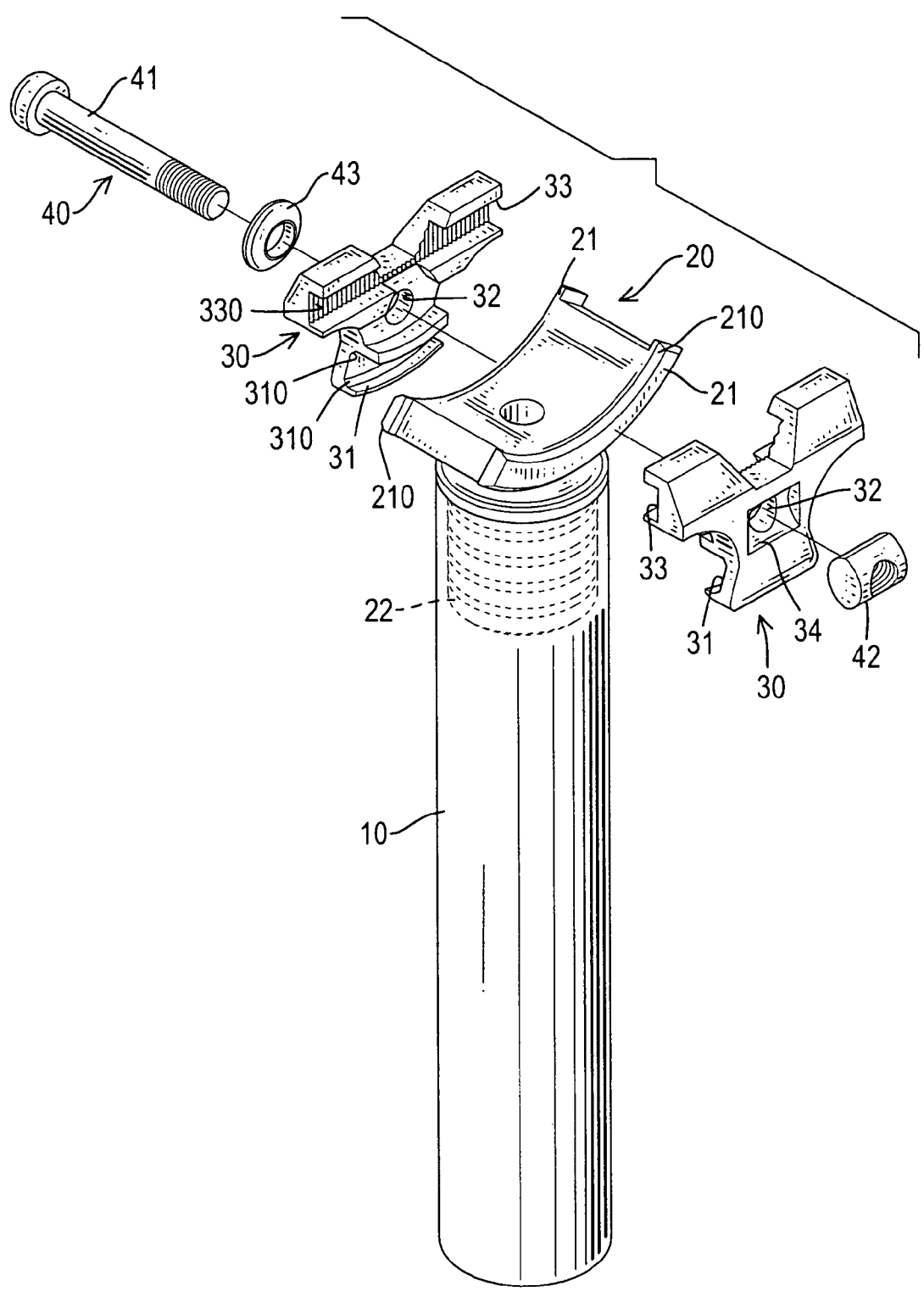
FIG. 1 is an exploded perspective view of the adjustment assembly of the present invention.

With reference to FIG. 1, it is noted that the adjustment assembly in accordance with the present invention includes a base (20), a pair of adjusting seats (30) and a securing element (40).

The base (20) is adapted to be mounted on top of a hollow seat post (10) and includes two arcuate rails (21) formed respectively on two opposed sides of the base (20) and a connector (22) formed on a bottom of the base (20) to be inserted into an opening of the hollow seat post (10). The base (20) further has an inclined portion (210) formed on two respective edges of each of the arcuate rails (21).

Each of the two adjusting seats (30) is provided at two opposed sides of the base (20) and has an arcuate track (31) formed on a bottom thereof to correspond to and receive therein a corresponding one of the arcuate rails (21) of the base (20), a through hole (32) defined therethrough and a clamping portion (33) formed on a top portion of the adjusting seat (30). The adjusting seat (30) further has an inclined portion (310) formed on two respective edges of the arcuate track (31) to correspond to a corresponding one of the inclined portions (210) of the base (20) and teeth (330) formed on an inner face of the clamping portion (33).

The securing element (40) is a combination of a bolt (41), a nut (42) and a washer (43).

Figure 2:
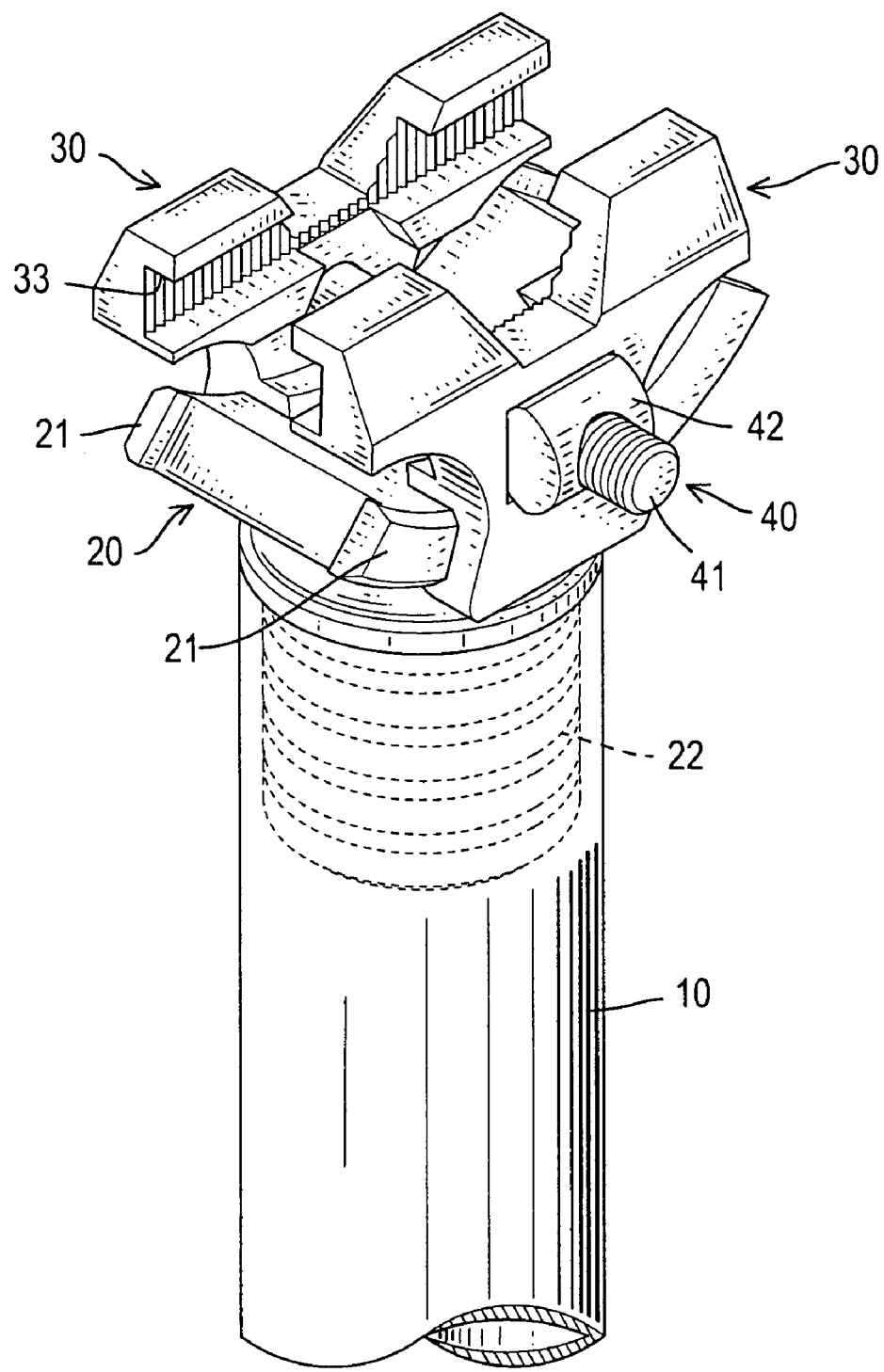
FIG. 2 is a perspective view showing that the adjustment assembly is mounted on top of a seat post.
Figure 3:
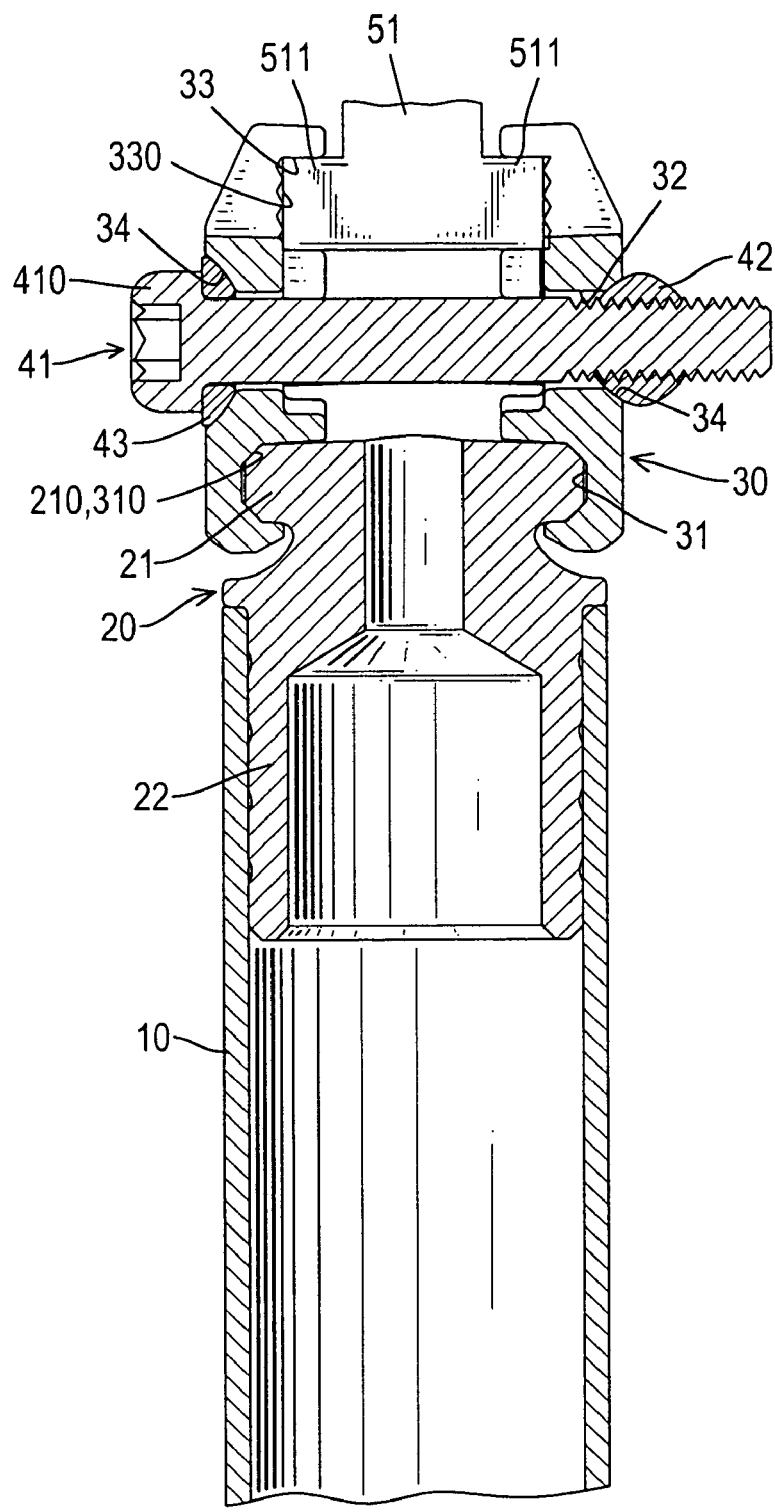
FIG. 3 is a schematic cross sectional side plan view showing the engagement between the adjustment assembly and the bicycle seat.
Figure 4:
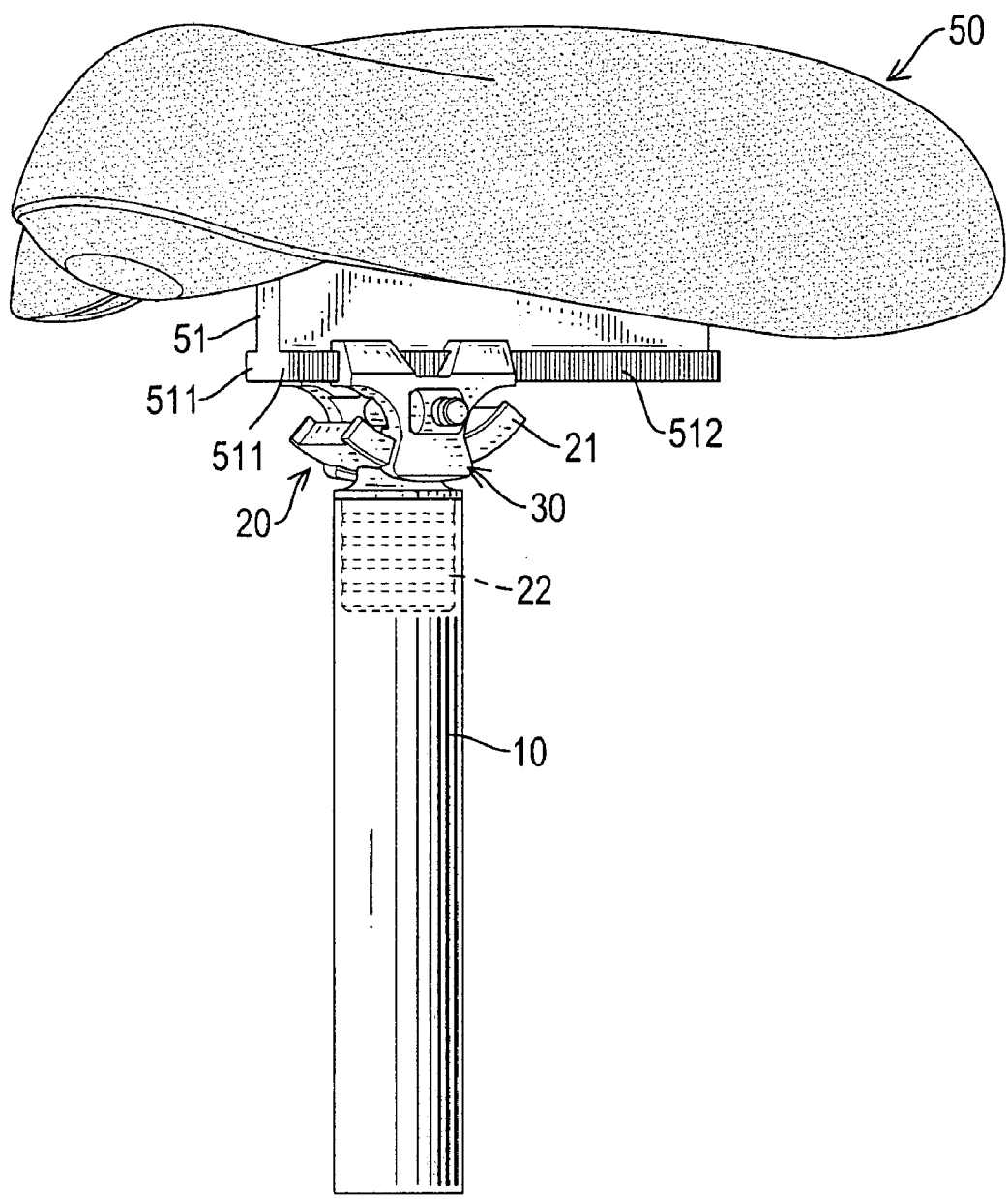
FIG. 4 is a schematic view showing that the bicycle seat is able to be moved linearly via engagement between the first rack on the base and the second rack on the extension of the bicycle seat.

With reference to FIGS. 2, 3 and 4, when the adjustment assembly of the present invention is assembled, it is noted that each of the arcuate rails (21) of the base (20) is received in the corresponding one of the two arcuate tracks (31). Thereafter, the bolt (41) is extended through the washer (43) and the two through holes (32) of the two adjusting seats (30) to be threadingly connected to the nut (42). From the depiction of the corresponding drawings, especially FIG. 1, each adjusting seat (30) is provided with an arcuate cutout (34) defined in an outer face of the adjusting seat (30) to correspond to and receive therein the nut (42) or the washer. The nut (42) and the washer (43) respectively have an arcuate surface corresponding to the arcuate cutouts (34) of the two adjusting seat (30), are received in the arcuate cutouts (34) of the two adjusting seats (30) throuah the arcuate surfaces thereof, and are respectively secured inside the arcuate cutouts (34) of the two adjusting seats (30). After the bolt (41) secures engagement between the base (20) and the adjusting seats (30), the washer (43) is able to maintain tension between the bolt (41) and the nut (42).

When assembly of the present invention is finished, a bicycle seat (50) having an extension (51) formed on a bottom of the seat (50) and two shoulders (511) respectively formed on two opposed sides of the extension (51) is able to be sandwiched between the two adjusting seats (30). It is noted that the extension (51) is first sandwiched between the two adjusting seats (30) after the bolt (41) is loosened. Then the rider is able to tighten the bolt (41) to position the bicycle seat (50) between the two adjusting seats (30) so as to complete the mounting of the bicycle seat (50).

Figure 5:
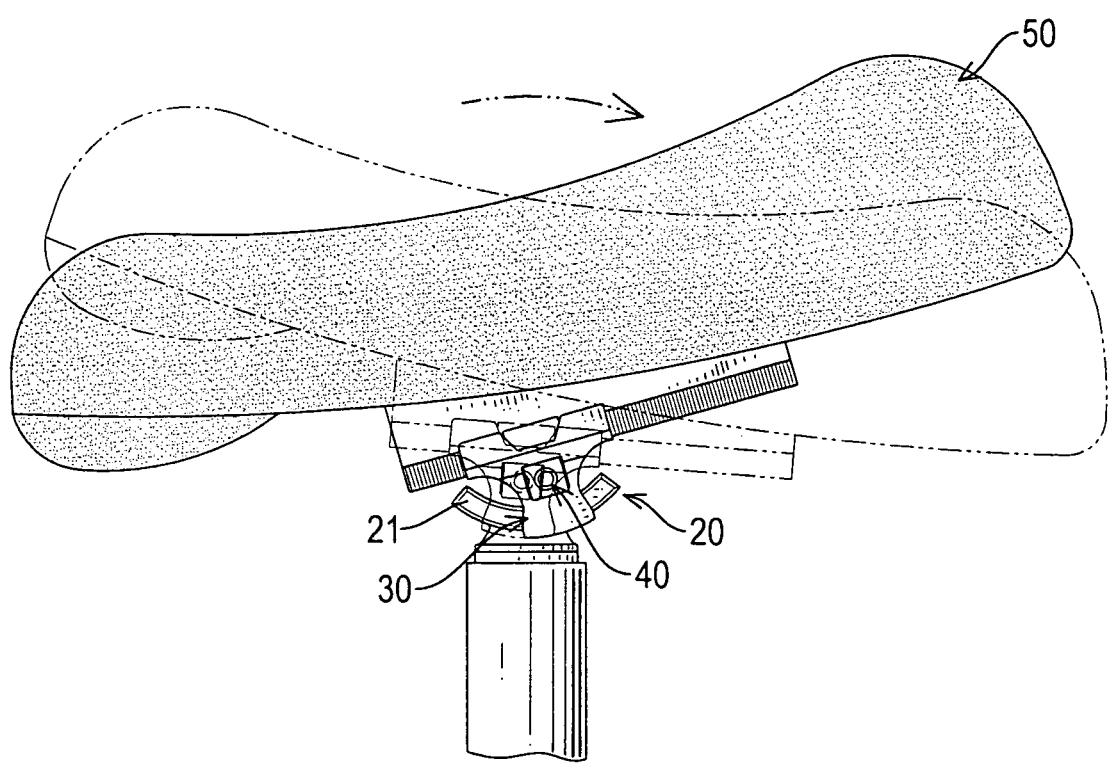
FIG. 5 is a schematic view showing that the bicycle seat angle is adjustable via an arcuate configuration in both the adjusting seat and the base.

To secure engagement of the extension (51) with the adjusting seats (30), preferably, the extension (51) has a rack (512) formed on an outer side of each of the shoulders (511) to correspond to the teeth (330) of the clamping portion (33). When the rider is to adjust the bicycle seat position relative to the seat post (10), the rider may use the interaction between the teeth (330) and the rack (512) to slide the bicycle seat (50) relative to the seat post (10) so as to adjust the position of the bicycle seat (50). That is, when the inclined portion (210) formed on two respective edges of each of the arcuate rail (21) of the base (20) abut with the inclined portion (310) formed on two respective edges of the arcuate track (31) of the adjusting seat (30), a gap is defined between the free end of each rail (21) and the inner surface of the corresponding track (31) and the bicycle seat (50) is fixed and secured. Because of the arcuate rails (21) of the base (20) and the arcuate tracks (31) of the adjusting seats (30), movement of the bicycle seat (50) as well as the adjusting seats (30) is able to change the angle of the bicycle seat (50), as shown in FIG. 5.

Figure 6:
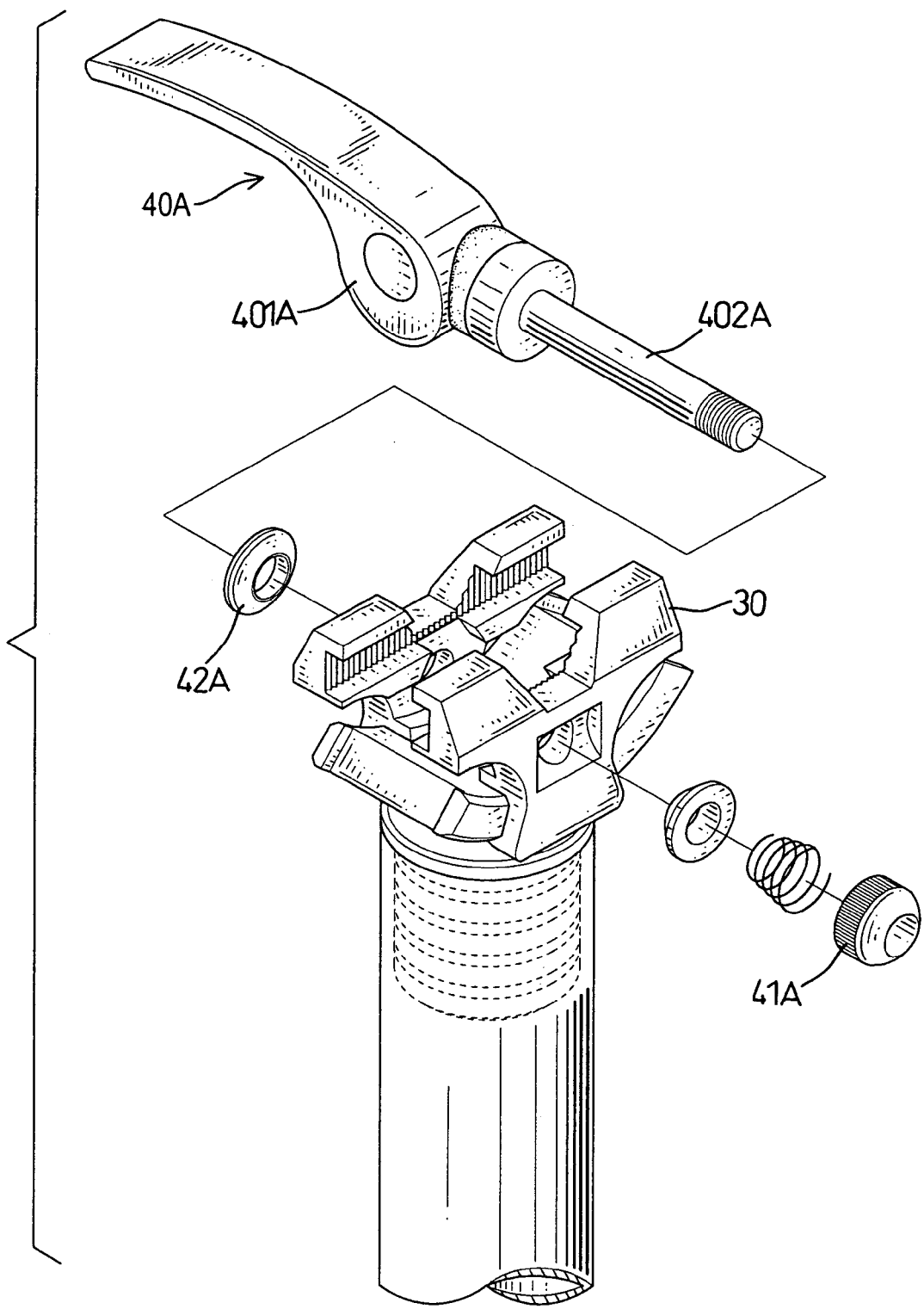
FIG. 6 is an exploded perspective view showing alternative embodiment of the securing element to secure engagement between the adjusting seat and the base.

With reference to FIG. 6, the securing element (40) may be replaced by a combination of a handle (40A) with a wedged boss (401A), a nut (41A) and a washer (42A). The handle (40A) has a bolt (402A) extending out of the wedged boss (401A). The connection between the bolt (402A) and the nut (42A) is the same as that described earlier. The only difference therebetween is that the securing element (40A) uses the wedged head (401A) to urge the washer (42A) so as to secure the two adjusting seats (30) after the bolt (402A) is extended through the two adjusting seats (30) to threadingly connect to the nut (41A).

Figure 7:
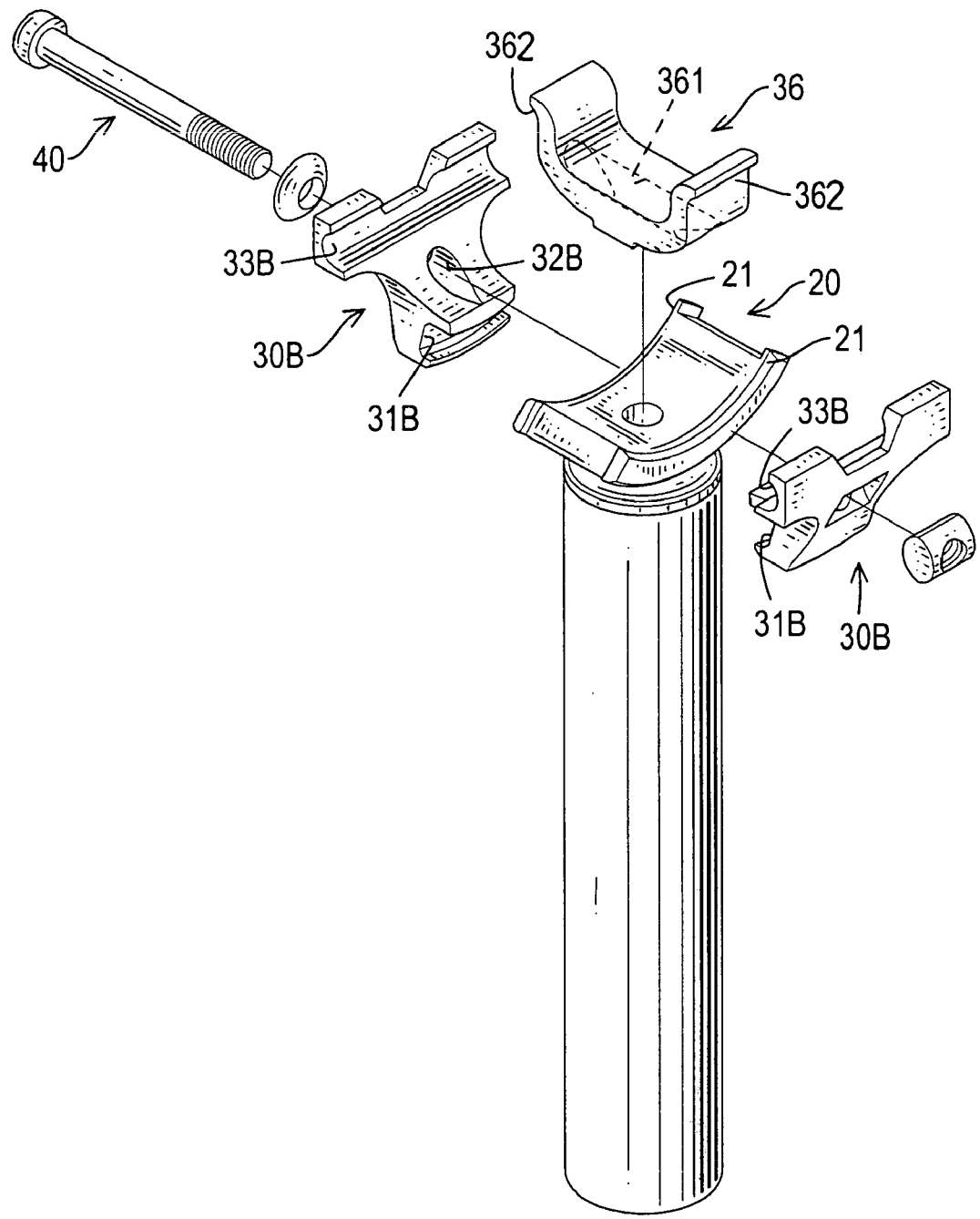
FIG. 7 is an exploded perspective view showing alternative embodiment of the adjustment assembly of the present invention for clamping a different bicycle seat.

With reference to FIG. 7, a different embodiment of the present invention includes a base (20), a pair of adjusting seats (30B), a securing element (40) and a mediate block (36) sandwiched between the two adjusting seats (30B).

The base (20) has a configuration the same as that described in the earlier embodiment. However, each of the adjusting seats (30B) is configured to have an arcuate track (31B) to correspond to and receive therein the arcuate rail (21), a through hole (32B) defined therethrough to allow extension of the securing element (40) and an arcuate chute (33b) defined in an inner side face of the adjusting seat (30B).

The mediate block (36) has a body (not numbered) with a passage (361) defined therethrough to correspond to and communicate with the through hole (32B) of each of the adjusting seats (30B) so that the securing element (40) is able to extend through the through holes (32B) and the passage (361) and two wings (362) respectively formed on two opposed sides of the body and extending toward two opposite directions. Each wing (362) has a sharp edge formed on a free end of the wing (362) to correspond to a portion of the arcuate chute (33B).

Figure 8:
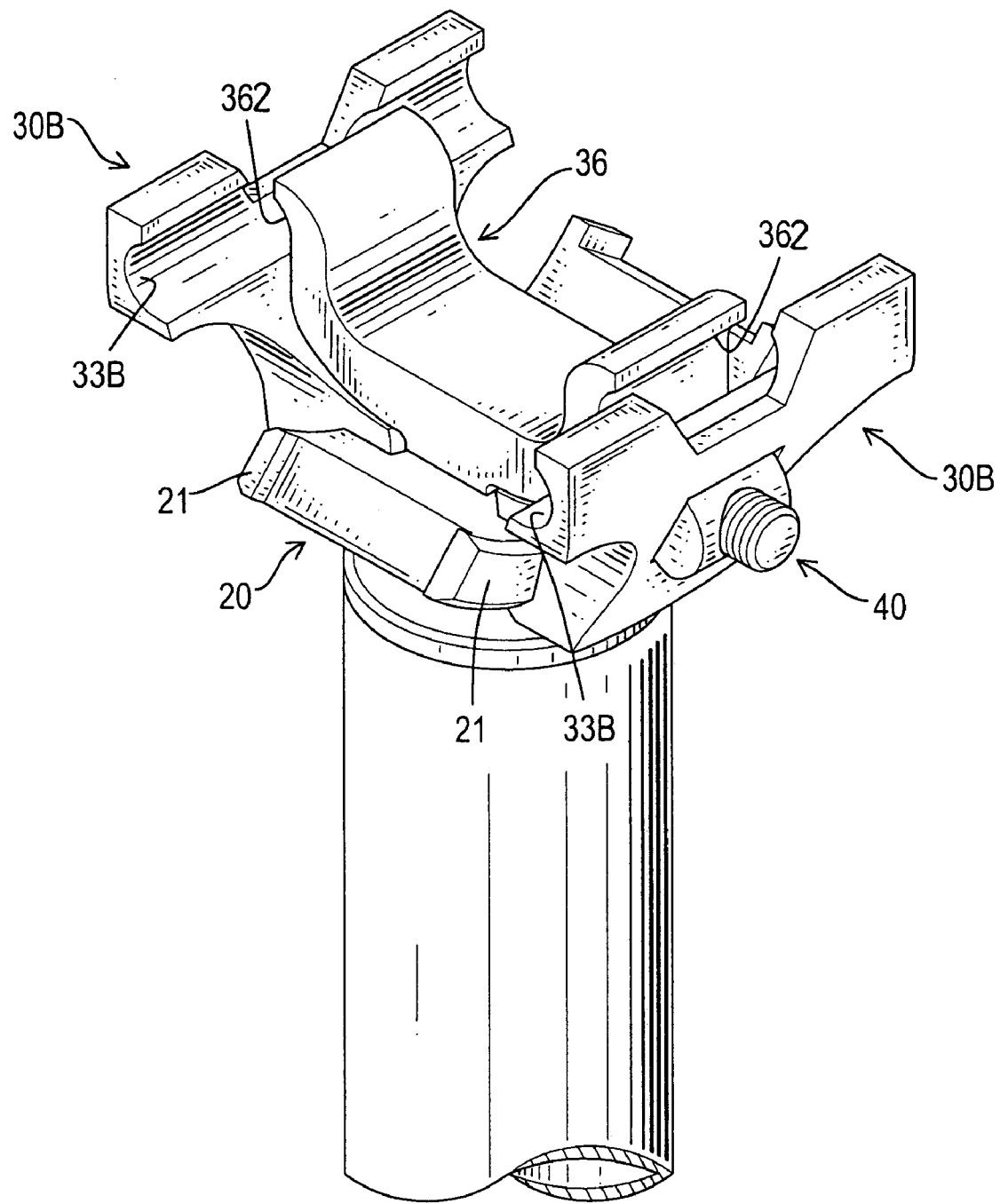
FIG. 8 is a perspective view showing the adjustment assembly is mounted on the seat post.

With reference to FIG. 8, when the preferred embodiment adjustment assembly of the present invention is assembled, the securing element (40) is extended through the through holes (32B) and the passage (361) to threadingly connect to the nut opposite to the fastener after the mediate block (36) is placed between the two adjusting seats (30B) to align the passage (361) with the two through holes (32B). After the mediate block (36) is positioned via the securing element (40), the sharp edges of the two wings (362) enclose a portion of each of the chutes (33B) of the respective adjusting seat (30B).

Figure 9:
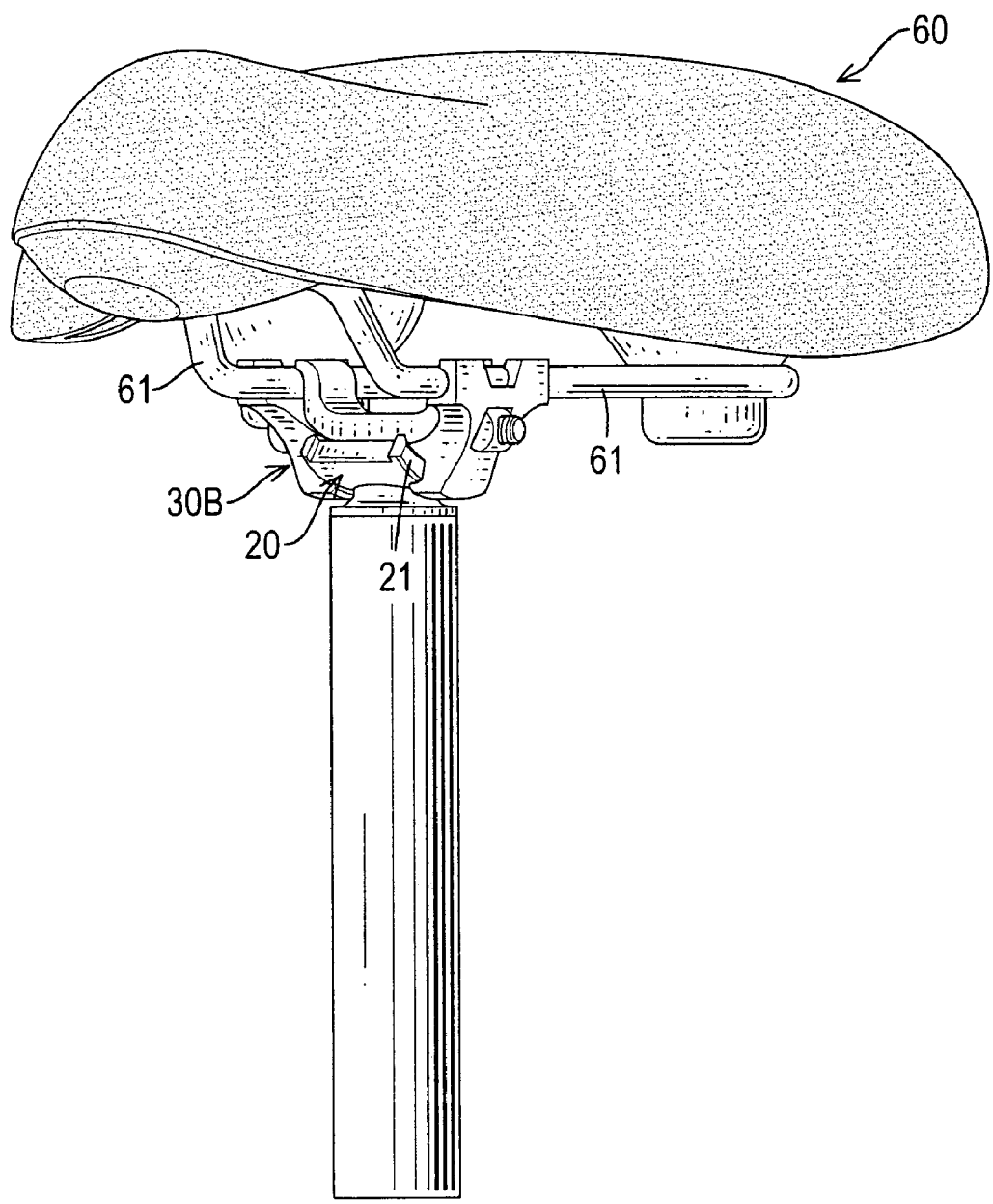
FIG. 9 is a perspective view showing that a different bicycle seat is mounted on top of the adjustment assembly in FIG. 8.
Figure 10:
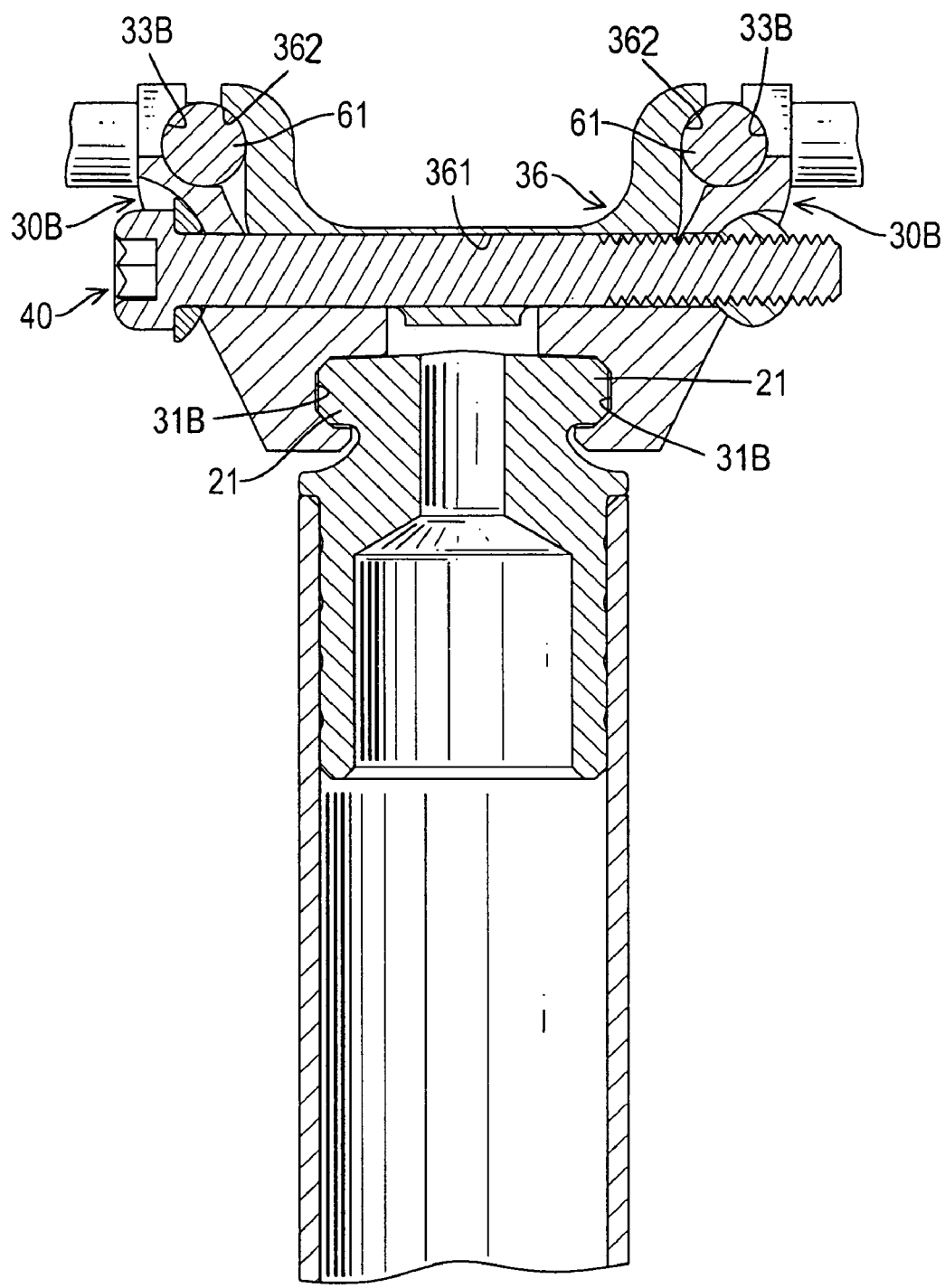
FIG. 10 is a schematic cross sectional view showing that the adjustment assembly in FIG. 8 clamps a bicycle seat with two bars extending from a bottom of the bicycle seat.

With reference to FIGS. 9 and 10, when a bicycle seat (60) having two bars (61) extending from a bottom of the bicycle seat (60) is to be secured in the adjustment assembly of this embodiment, the bicycle seat (60) may be secured in the adjusting assembly via extending each of the two bars (61) into a gap defined between the chute (33B) and the sharp edge of the wing (362). Thereafter, the two bars (61) of the bicycle seat (60) are secured between the adjusting seat (30B) and the mediate block (36) via the result of the movement of the two adjusting seats (30B) toward each other due to the tightening of the securing element (40).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustment assembly for securing a bicycle seat, the adjustment assembly comprising:

a base adapted to be mounted on top of a seat post and having an arcuate rail formed on two opposed sides of the base and each arcuate rail having two inclined portions formed respectively on two respective edges of each arcuate rail;

two adjusting seats oppositely and slidably connected to the base, each adjusting seat having an arcuate track formed on a bottom thereof to correspond to and to receive therein a corresponding one of the arcuate rails of the base, a clamping portion formed on a top portion of each adjusting seat, a through hole defined therethrough and an arcuate cutout defined in an outer face of each adjusting seat, and each arcuate track having two inclined portions formed respectively on two respective edges of each arcuate track to correspond respectively to the inclined portions on a corresponding one of the arcuate rails of the base, wherein the two adjusting seats are movable relative to the base after the two arcuate rails of the base are received in the corresponding arcuate tracks of the adjusting seats and the bicycle seat sandwiched between the two adjusting seats is able to move along with the two adjusting seats relative to the base to accomplish angle change purpose; and a securing element having a bolt, a washer and a nut, wherein the bolt is extended through the washer and the two through holes of the two adjusting seats to be threadingly connected to the nut, and the washer and the nut respectively have an arcuate surface corresponding to the arcuate cutouts of the two adjusting seats are received in and secured inside the arcuate cutouts of the two adjusting seats through the arcuate surfaces, whereby the washer is able to maintain tension between the bolt and the nut.

2. The adjustment assembly as claimed in claim 1, wherein each adjusting seat further has teeth formed on an inner face of the clamping portion for mating with a rack formed on the bicycle seat such that after the securing element is loosened, the bicycle seat position is able to be changed via an interaction between the teeth and the rack.

3. The adjustment assembly as claimed in claim 1, further comprising a mediate block sandwiched between the two adjusting seats and having a body with a passage defined therethrough to allow extension of the securing element so that the securing element is able to extend through the two adjusting seats and the passage and two wings respectively formed on two opposed sides of the body and extending toward two opposite directions, each wing having a sharp edge formed on a free end of the wing to correspond to and to enclose a portion of the clamping portion such that a space defined between the sharp edge of the wing and an inner face of the clamping portion is adapted to receive therein a bar extending from a bottom of the bicycle seat.

4. The adjustment assembly as claimed in claim 1, further comprising a mediate block sandwiched between the two adjusting seats and having a body with a passage defined therethrough to allow extension of the securing element so that the securing element is able to extend through the two adjusting seats and the passage and two wings respectively formed on two opposed sides of the body and extending toward two opposite directions, each wing having a sharp edge formed on a free end of the wing to correspond to and to enclose a portion of the clamping portion such that a space defined between the sharp edge of the wing and an inner face of the clamping portion is adapted to receive therein a bar extending from a bottom of the bicycle seat.

* * * * *